Patented July 17, 1951

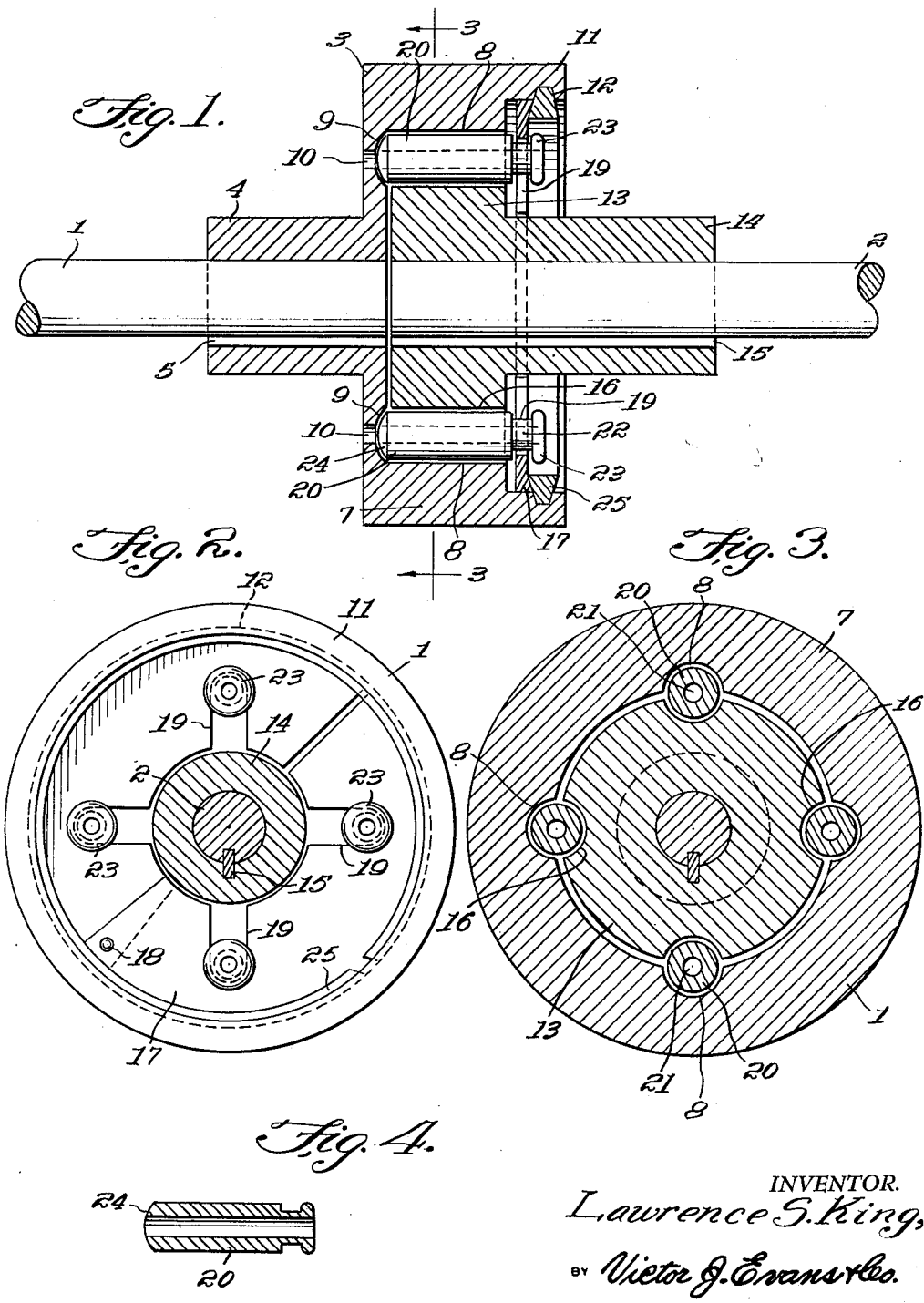

2,560,958

UNITED STATES PATENT OFFICE 2,560,958

RESILIENT DRIVE COUPLING

Lawrence S. King, Oklahoma City, Okla., assignor to King-Yates, Oklahoma City, Okla., a co-partnership Application March 4, 1949, Serial No. 79,670

4 Claims. (Cl. 64—11)

The present invention relates to the general class of flexible couplings of the head and socket type for axially alined rotary shafts, and more specifically to an improved resilient drive coupling which while well adapted for various purposes and uses is especially designed for coupling a motor or drive shaft with the operating shaft of a pump or other similar appliance.

The primary purpose of the invention is the provision of a perfectly balanced driving and power transmitting mechanism operating with a minimum of friction, and air-cooled or ventilated to insure durability and smooth working of its operating parts. The novel flexible drive or coupling includes a minimum number of parts that may be manufactured with facility and low cost of production, the parts may be assembled with convenience and installed for use with a minimum expenditure of time and labor, and when necessary repairs and replacements may readily be made.

The invention consists in certain novel features of construction and combinations and arrangements of metallic and non-metallic parts in the coupling as will hereinafter be described and more particularly set forth in the appended claims. In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying drawings and mechanical structures, within the scope of my claims, without departing from the principles of the invention.

Figure 1 is a vertical longitudinal sectional view of a coupling in which my invention is embodied.

Figure 2 is a vertical sectional view as seen from the right in Fig. 1.

Figure 3 is a transverse vertical sectional view through the coupling; and

Figure 4 is a longitudinal sectional view of one of the coupling pins.

In Fig. 1 the drive shaft is designated as 1 and the axially alined driven shaft as 2; and the drive shaft is equipped with a socket member or housing 3 having a hub 4 that is keyed or splined to the shaft at 5. The metallic housing or socket is fashioned with a comparatively thick annular wall 7 of cylindrical shape, and the inner periphery of the wall is provided with an annular series of semi-circular longitudinally extending grooves 8, here shown as four in number and circumferentially spaced within the housing. At their outer ends these grooves terminate in rounded concave seats 9 in the face of the vertical wall of the housing and the seats are each provided with an air opening or vent port 10 opening to the atmosphere.

The open side of the housing is formed with an annular flange 11 that is provided with an annular inner groove 12, preferably of wedge shape in cross section.

For coaction with the driving housing, a circular driven disk or head 13 having a hub 14 is enclosed by the housing and the head is keyed to revolve with the driven shaft by means of a key or spline 15.

The circular head or disk is fitted within the wall 7 of the housing, and the exterior periphery of the head is grooved, as at 16, to provide complementary grooves for the grooves of the housing, and these two registering sets of grooves form a series of approximately cylindrical bores for use in coupling together the housing and the head.

The coupling elements of the coupler are fashioned of non-metallic, durable material, such as pressed fiber, to reduce to a minimum the friction and wear between coacting parts, and for this purpose I provide a sectional guard or carrier 17 in the nature of a detachable circular flat disk or washer, the sections of which are hinged together at 18. The guard, open at the center to slip over the hub 14, is of slightly less diameter than the inner diameter of the flange 11, and it is provided with four radial slots 19 or notches complementary to the four bores of the coupler.

In each of the slots of the sectional and detachable guard a cylindrical tubular coupling pin 20 is carried and the pins are inserted in the four bores of the coupler to transmit torque from the driving shaft and clutch housing to the driven head and shaft of the coupling.

Each of the tubular pins has a longitudinally extending bore 21, with open ends, and it will be apparent that the interior bores of the pins, the bearing bores between the housing and the head, and the vent openings 10 of the housing, provide venting means for these bearings that convey heat from the interior of the coupling while the shafts are operating and thereby enhance the durability of the coupling members.

The several coupling pins are each connected with the guard or carrier by means of an annular groove 22 that forms a head 23 on the pin and the head and groove coact with the walls of the slots 19 to retain the pins in place. The outer ends of the pins are rounded as at 24 for co-action with the concave seats 9 of the housing, and the guard is retained in operative position by means of a readily detachable retaining ring as 25. The ring, of split resilient fiber is slipped over the hub of the driven head and, due to its wedge shape in cross section, it is readily expanded into the annular groove 12 of the housing with its inner face pressing against the complementary outer face of the guard, to hold the guard and the pins carried thereby in operative position. The retaining ring is frictionally held in the groove, and due to centrifugal force created by the coupling when the shafts are operating, the ring is rigidly held against displacement.

Having thus fully described my invention, what I claim as new and desire to secure by Letters Patent is:

1. The combination in a shaft coupling with a driven head, an enclosing driving housing, and an annular series of interior longitudinally extending bores formed between the head and housing, of a series of non-metallic coupling pins located within the bores, a non-metallic slotted sectional guard supported on the pins, and a detachable non-metallic retaining ring for the guard mounted in the housing.

2. The combination in a shaft coupling with a driven head an enclosing driving housing and an annular series of open-end bores formed between the housing and head, of a series of tubular coupling pins located in the bores, a slotted sectional guard plate mounted on the pins, and a detachable retaining ring for the guard plate mounted in the housing.

3. The combination in a shaft coupling with a driven head, an enclosing driving housing having an annular groove, and an annular series of bores formed between the head and housing, of a series of fiber coupling pins located in the bores, a slotted fibrous plate mounted on the pins, and a wedge shaped detachable retaining ring mounted in the annular groove for coaction with the fibrous plate.

4. The combination in a shaft coupling with a driven head having exterior grooves, an enclosing housing having an inner annular groove and interior grooves coacting with said exterior grooves to form open end bores, of a series of tubular fiber pins located in the bores and having exterior grooves, a slotted hinged guard plate of fibrous material mounted on the grooves of the pins, and a split retaining ring of fibrous material for the guard plate mounted in the annular groove of the housing.

LAWRENCE S. KING.

REFERENCES CITED

The following references are of record in the file of this patent:

UNITED STATES PATENTS

| Number | Name | Date |
|---|---|---|
| 1,467,185 | Meriam | Sept. 4, 1923 |
| 1,552,892 | Suppler | Sept. 8, 1925 |